US007267321B1

(12) United States Patent
Morrell

(10) Patent No.: US 7,267,321 B1
(45) Date of Patent: Sep. 11, 2007

(54) WALL BLOCK MOLD

(76) Inventor: Kelly J. Morrell, 8350 Decathlon Dr., Spicer, MN (US) 56288

( * ) Notice: Subject to any disclaimer, the term of this patent is extended or adjusted under 35 U.S.C. 154(b) by 261 days.

(21) Appl. No.: 10/911,120

(22) Filed: Aug. 3, 2004

Related U.S. Application Data

(63) Continuation-in-part of application No. 10/437,565, filed on May 14, 2003.

(51) Int. Cl.
*B29C 70/00* (2006.01)
*B28B 11/08* (2006.01)

(52) U.S. Cl. ...................... 249/102; 249/104; 249/155; 425/183

(58) Field of Classification Search ............ 249/114.1, 249/119, 171, 102; 264/162
See application file for complete search history.

(56) References Cited

U.S. PATENT DOCUMENTS 468,838 A 2/1892 Steiger
767,829 A 8/1904 Ozee
788,481 A 4/1905 Lightner
789,996 A 5/1905 McCullough
799,754 A 9/1905 Petrie
800,067 A 9/1905 Brooke
987,225 A 3/1911 Fobes
1,332,246 A 3/1920 Coates
1,581,797 A 4/1926 Fey
1,767,163 A 6/1930 Ackermann
2,392,551 A 1/1946 Roe
4,815,897 A 3/1989 Risi et al.
4,860,505 A 8/1989 Bender
5,031,376 A 7/1991 Bender et al.
5,217,630 A * 6/1993 Sayles ......................... 249/52
5,252,017 A 10/1993 Hodel
5,277,012 A 1/1994 Woolbright
5,294,216 A 3/1994 Sievert
5,622,456 A 4/1997 Risi et al.
5,960,604 A 10/1999 Blanton
6,062,772 A 5/2000 Perkins
6,138,983 A * 10/2000 Sievert .................... 249/114.1
6,209,848 B1 * 4/2001 Bolles et al. ............... 249/119
6,253,519 B1 7/2001 Daniel
6,312,197 B1 11/2001 Woodford et al.
6,539,682 B1 4/2003 Ryder
6,609,695 B2 * 8/2003 LaCroix et al. ............. 249/130
6,616,382 B2 9/2003 Woodford et al.
6,651,401 B2 11/2003 Price et al.
6,715,965 B2 4/2004 Manthei et al.
6,735,913 B2 5/2004 Sanders et al.
6,854,702 B2 2/2005 Manthei et al.
2003/0164574 A1 * 9/2003 Hammer et al. ............ 264/162

* cited by examiner

*Primary Examiner*—James P. Mackey
*Assistant Examiner*—Dimple Bodawala
(74) *Attorney, Agent, or Firm*—Moore & Hansen, PLLP

(57) ABSTRACT

A system and method of forming differently sized and/or textured construction blocks from a single mold. The system includes a mold having a base and movable side walls that cooperate with the base to form a mold cavity, and one or more inserts that are configured to be positioned in the mold. The mold is arranged and oriented so that its side walls form the top, bottom, front, and rear surfaces of each block. The inserts may be used individually or grouped together into predetermined sets to form different blocks, such as interior and end blocks, as well as cap stones.

26 Claims, 9 Drawing Sheets

WALL BLOCK MOLD

CROSS REFERENCE TO PRIOR APPLICATION

This is a continuation-in-part of application Ser. No. 10/437,565, filed May 14, 2003.

FIELD OF THE INVENTION

The present invention generally relates to masonry blocks. More particularly, the present invention relates to mortarless masonry blocks that may be used to construct vertical freestanding walls or sloping walls.

BACKGROUND OF INVENTION

Mortarless masonry blocks have been known and used for many years. They are quite popular because they do not require extensive site preparation or the services of skilled craftsmen, and they are aesthetically pleasing, invoking feelings of stability, durability, and permanence. Besides being attractive and sturdy, they are generally small enough to be able to be lifted and manipulated by one person. They can range from about 6-120 pounds but more typically, though, they range around 35-70 pounds. In addition, they characteristically have only one facing or exposed face with an area in the range of about 0.17 to 1.00 square feet, and have corresponding volumes that range from about 126 to 2880 cubic inches. Such masonry blocks are commonly used to construct low retaining walls or planters, for example.

Most mortarless masonry blocks are manufactured using a process known in the trade as dry casting. With this process, block material having a comparatively low percentage of water (as opposed to block material that is wet cast) is deposited into an open-ended, unitary mold that is positioned on a palette and compacted by a movable piston as it moves towards the palette. Once the desired amount of compaction has been achieved, the compacted material is ejected or stripped from the mold by lifting the mold and/or moving the piston relative to the palette, or by vibrating the mold as it is moved away from the palette. The molded block is then cured outside of the mold in a series of separate steps.

This process allows many blocks to be manufactured in a comparatively rapid fashion because the molds are not required for the curing process. As will be understood, then, in order for these types of molds to be used most efficiently, they are usually constructed and arranged to facilitate extrusion or stripping. Most molds, therefore, comprise a vertically walled, unitary frame with no indentations or protrusions that would hinder extrusion or stripping. Blocks produced by such molds are usually symmetrically shaped so that the block may be subsequently split into two smaller, similarly shaped blocks, with each block having a substantially planar roughened facing. Alternatively, some molds may have walls with small transverse bottom ledges, or roughened divider walls, which are designed to work an uncured surface of a block as it is stripped from the mold. As will be understood, such ledges or divider walls are only capable of producing a substantially planar roughened surface, similar to the surfaces produced using the splitting technique described above.

A drawback with the afore-mentioned manufacturing techniques is that they are unable to produce a block that has a roughened facing that is bowed or curved with respect to the extrusion or stripping direction. If such a bowed facing is desired, the block must be worked after it has been stripped from the mold and cured, for example, by additional processing steps such as tumbling or grinding. As one may imagine, each additional processing step adds to the time and cost of the finished product.

A drawback with the afore-mentioned dry cast blocks is that that they are relatively small. This does not present much of a problem when retaining walls are less than 4 or 5 courses high. However, for retaining walls whose heights exceed 4 or 5 courses, it is usually necessary to provide stabilization devices to counteract the forces exerted by backfill material. Stabilization devices usually take the form of flexible sheets of a mesh-like synthetic material known in the trade as geo-grids, for example, which are usually positioned between courses of blocks and which extend horizontally and rearwardly into the backfill material that is being retained. Stabilization devices such as geo-grids may be connected to blocks by connectors, but usually they are frictionally retained in place between courses by the weight of the blocks pressing down on them. Often, it is necessary to provide stabilization devices for each course of blocks or for every other course of blocks, which adds to the cost of materials, labor, and time of construction. Unfortunately, stabilization devices can stretch, break, or be pulled out from the wall structure, which can lead to premature wall failure.

Another drawback common to most dry cast blocks is that they usually have only one facing or exposed face area. Thus, they are limited to a particular orientation within a structure. This limitation is underscored when the blocks are trapezoidal in shape, for example.

Another drawback common to most dry cast blocks is that they are designed and configured to engage vertically adjacent blocks in certain, predetermined arrangements. For example, some blocks are designed so that they can only be used to build vertical walls, while other blocks are designed so that they can only be used to build walls that have a predetermined batter or upwardly receding slope. Engagement between vertically adjacent blocks is most commonly achieved by providing blocks with integrally formed lips or protrusions that are designed to engage vertically adjacent blocks. Alternatively, engagement between vertically adjacent blocks may be achieved by providing connectors or pins that tie the blocks together.

Thus, there is a need for a masonry block that can be used to construct different wall structures. There is also a need for a masonry block that can be positioned in one of several predetermined orientations relative to vertically adjacent blocks to create different types of wall structures. There is also a need for a block that is able to engage vertically adjacent blocks without the use of extraneous devices or connectors. And, there is a need for a block that is capable of resisting normal forces without having to be operatively connected to stabilization devices such as geo-grids and/or earth anchors.

SUMMARY OF THE INVENTION

The present invention is directed to masonry blocks that may be used to construct different types of wall structures. The masonry blocks have front and back surfaces, opposing side surfaces, a top surface, and a bottom surface, and are configured so that when they are arranged in a wall structure comprising multiple courses, the blocks of adjacent courses are able to interlock or engage each other so that they are better able to resist forces normal to the wall structure.

The top surface and bottom surfaces of each block include at least one channel and a projection, respectively. Preferably, the top surface of each block has two channels. The channels and the projection of each block are substantially linear and are aligned with each other so that they extend in the same direction relative to the block, such as across the width of the block between its opposing sides. Each channel is configured to be able to constrainingly retain one or more projections of vertically adjacent blocks to prevent forward and backward movement therebetween. The channels are arranged so that they lie adjacent the front and rear surfaces of the block, respectively, while the projection is arranged so that it lies adjacent the rear surface of the block, in vertical alignment with rearmost of the two channels.

The provision of the two channels and the projection allow the blocks to be used to construct different types of walls. One type of wall, for example, is a substantially vertical wall. And, within that type, different styles may be constructed. A substantially vertical wall may be constructed in which the front surfaces of all of the blocks are all on the same side of the wall, as with a running bond, for example. Such a wall will have only one side that has a substantially monolithic appearance, without large-gapped joints between adjacent blocks.

Alternatively, a substantially vertical wall may be constructed in which the blocks of each course of blocks are arranged in an alternating manner so that a front surface is between two rear surfaces, and a rear surface is between two front surfaces. This style of construction will result in a wall with opposing sides that appear substantially the same. That is, both sides of the wall have a substantially monolithic appearance. Another substantially vertical wall may be constructed in which a majority of blocks are positioned so that their front surfaces are on the viewable side of the wall and the remaining blocks are positioned in a somewhat random manner so that their rear surfaces are also on the viewable side of the wall. This style of construction will result in a wall having only one substantially monolithic appearing side.

Another type of wall that can be constructed using the blocks of the present invention is a sloping wall, where the wall has a predetermined batter. With this type of wall, the projections of blocks are not retained within the channels of vertically adjacent blocks. Rather, the projections are positioned so that they contact the upper margins of the rear surfaces of vertically adjacent blocks. This positions the block rearwardly with respect to the adjacent, lower block. An advantage with this type of wall structure is that it is better able to resist forces exerted by material it is retaining. Another advantage with this type of wall is that the wall may be arranged in a serpentine manner.

A mold for casting a masonry block is also disclosed. The mold is distinguished in that it is configured and arranged to cast a block on a side surface, as opposed to casting a block on its top or bottom surface. A mold conversion system is also disclosed. The conversion system is distinguished by its ability to modify the mold so that it is able to form blocks having different dimensions. The system features inserts, which may be used singularly or in conjunction with other inserts to form a desired block configuration. As will be appreciated the conversion system may take the form of a kit.

An object of the present invention is to provide a masonry block that may be used to construct a freestanding, substantially vertical wall.

Another object of the invention is to provide a masonry block that may be used to construct a wall having a predetermined batter or slope.

Yet another object of the present invention is to provide a block that has the size and bulk to be able to resist pressure exerted by retained material without having to be operatively connected to extraneous anchoring devices.

A feature of the present invention is that blocks in adjacent courses of blocks are able to interlock without the use of extraneous connectors.

Another feature of the present invention is that the block may be oriented in a variety of positions relative to adjacent blocks.

An advantage of the invention is that the block may be used to construct substantially vertical walls, walls having a slope or batter, walls comprising a combination of vertical and sloping portions, or serpentine walls.

Another advantage of the invention is that the block may be interlocked with blocks in adjacent courses of blocks without modifications or adaptors.

These and other objects, features and advantages of the present invention will become apparent from the following detailed description thereof taken in conjunction with the accompanying drawings, wherein like reference numerals designate like elements throughout the several views.

DETAILED DESCRIPTION OF THE INVENTION

Figure 1:
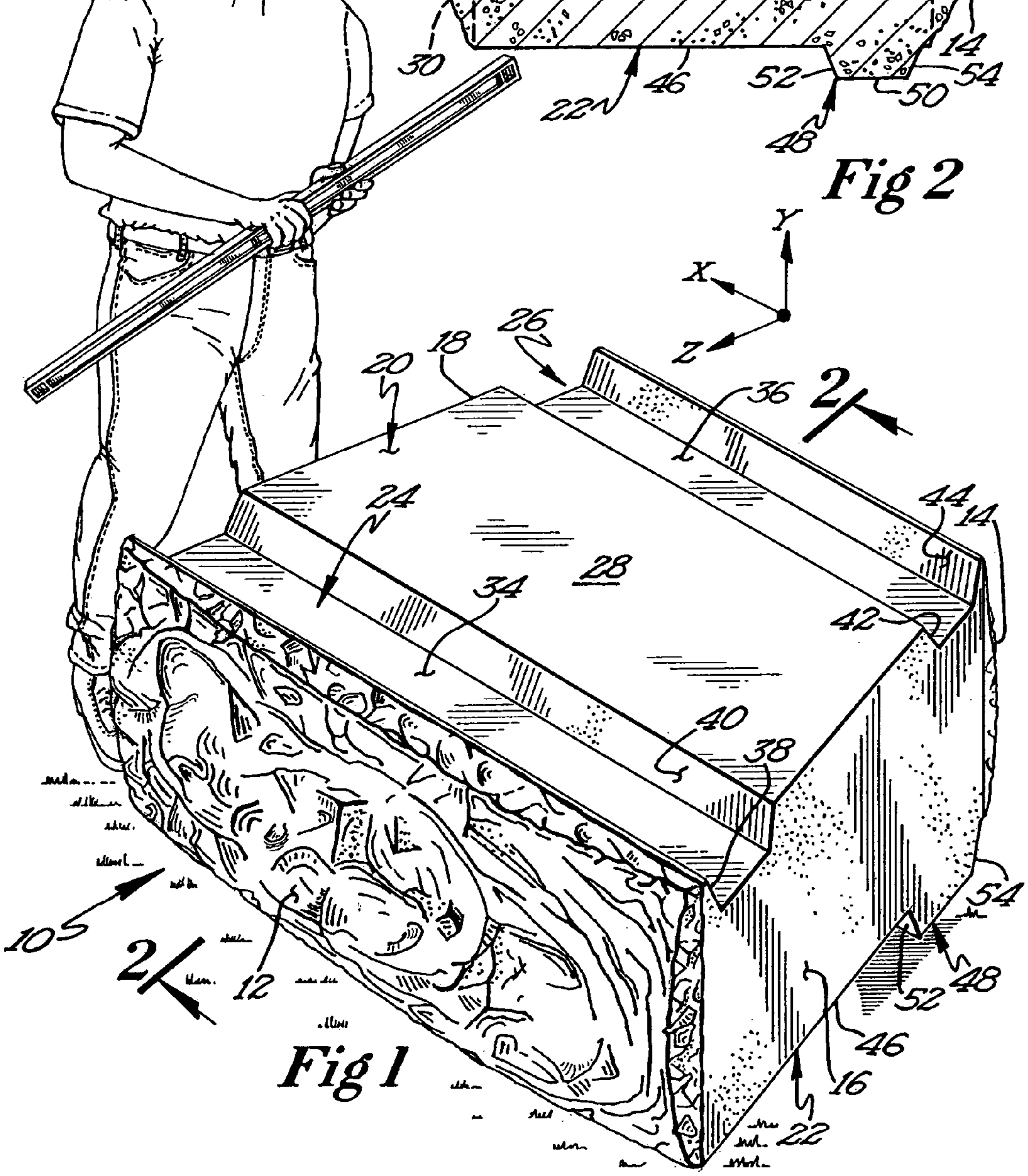
FIG. 1 is a perspective view of a preferred embodiment of the block of the present invention in juxtaposition with an averaged sized adult worker.

A preferred embodiment of a block of the present invention is depicted in FIG. 1. As can be seen, the block 10 is generally trapezoidally shaped and includes a front surface 12, a rear surface 14, a pair of opposed side surfaces 16 and 18 that extend between the front 12 and rear 14 surfaces, a top surface 20, and a bottom surface 22. The front surface 12, as shown, is rough textured and substantially non-planar, and extends outwardly with respect to the front edges of the top, bottom, and opposed side surfaces. Preferably, the maximum extent or relief of the outward extension is in the range of about 2.5 to 33.3 percent of the height of the block, taken in the y direction in a three-dimensional coordinate system. The rear surface 14 is similarly textured (see, for example, FIGS. 2, 4, and 7-12) and also extends outwardly with respect to the rear edges of the top, bottom, and opposed side surfaces. As with the front surface 12, the maximum outward extent or relief of the rear surface 14 is preferably in the range of about 2.5 to 33.3 percent of the height of the block, again taken in the y direction in a three-dimensional coordinate system. The maximum extent or relief of the outwardly extending front 12 and rear 14 surfaces is more clearly shown in FIG. 2. As depicted, the front and rear edges of the top 20 and bottom 22 surfaces define imaginary front 30 and rear 32 planes (shown in dashed lines), from which the maximum extents are measured. As applied to a block having a height in the range of about 18 inches, and a depth in the range of about 34 inches (as measured between the imaginary front and rear planes 30, 32), the maximum outward extent at each of the front and rear surfaces would be on the order of 0.35 to 6.00 inches, for example, and the total depth of the block could be increased from about ¾ of an inch to about 12 inches.

The top surface 20, as depicted, has two channels 24 and 26 that are spaced apart from each other by a center section 28. Preferably, both of the channels 24 and 26 are substantially linear and aligned so that they extend in the same direction, relative to the block 10. As depicted, this is preferably in the x direction in a three-dimensional coordinate system, across the width of the block and between the opposing side surfaces 16 and 18. The center section 28 is substantially planar and also preferably extends across the width of the block, between the opposing side surfaces 16 and 18.

Figure 2:
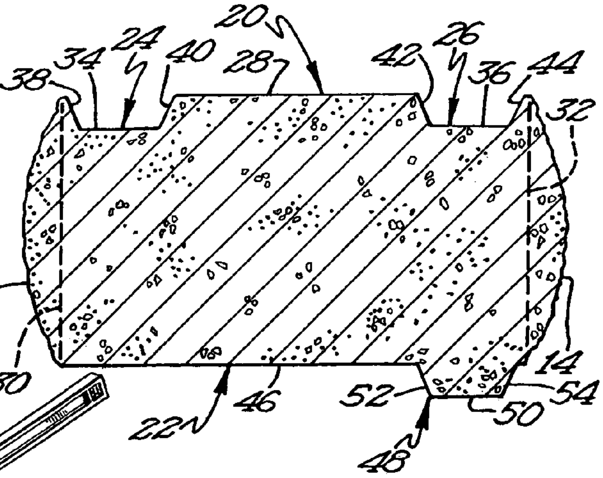
FIG. 2 is a cross-sectional view taken along lines 2-2 of FIG. 1.

As depicted in FIG. 2, each of the channels 24, 26 of the top surface 20 comprises a floor 34, 36 and a pair of side walls 38, 40, and 42, 44, respectively. Preferably, the side walls 38, 40, and 42, 44 of the channels 24 and 26 are angled away from each other so that the channels are wider at the top surface 20 than at their respective floors 34 and 36. As will be appreciated, the angled side walls 38, 40, and 42, 44 facilitate engagement with projections of vertically adjacent blocks, and also reduce the potential for chipping.

The bottom surface 22 includes a bottom section 46 and a projection 48, with the projection comprising a base 50 and a pair of engagement surfaces 52 and 54. Preferably, the engagement surfaces 52 and 54 are angled towards each other so that the projection tapers towards the base 50. As with the channels, the angled engagement surfaces 52 and 54 facilitate engagement with channels of vertically adjacent blocks, and they also reduce the potential for chipping.

Figure 3:
FIG. 3 is front elevational view of the preferred embodiment of FIG. 1.

Preferably, the projection 48 is located adjacent the rear surface 14 of the block 10 so that it is in vertical alignment with the rearmost channel 26. As with the channels, the projection 48 is also substantially linear. In addition, the projection 48 is aligned with the channels 24 and 26 such that it also extends substantially across the width of the block between the side surfaces 16 and 18, as shown in FIG. 3.

Figure 4:
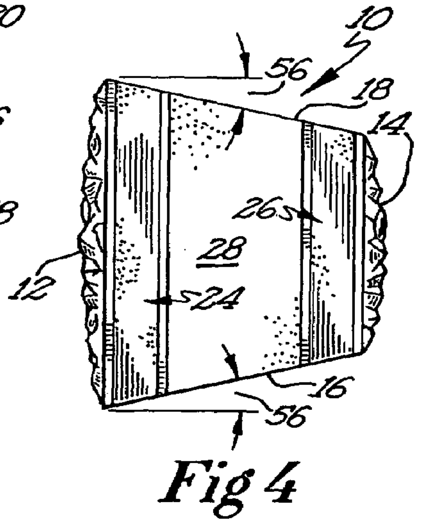
FIG. 4 is a top plan view of the preferred embodiment of FIG. 1.

The top surface 20 of the block 10, as shown in FIG. 4, is generally trapezoidal in shape with the side surfaces 16 and 18 angled towards each other from the front 12 surface to the rear surface 14. As will be appreciated, these angled side surfaces 16 and 18 permit the blocks to be arranged into a serpentine manner, without forming gaps between the side surfaces of adjacent blocks (see, for example, FIG. 12). Preferably, the angle 56 that the side surfaces make with respect to the z direction in a three-dimensional coordinate system (see, FIG. 1) is in the range of between 0 and 30 degrees, and more preferably on the order of about 6 to 23 degrees.

Figure 5:
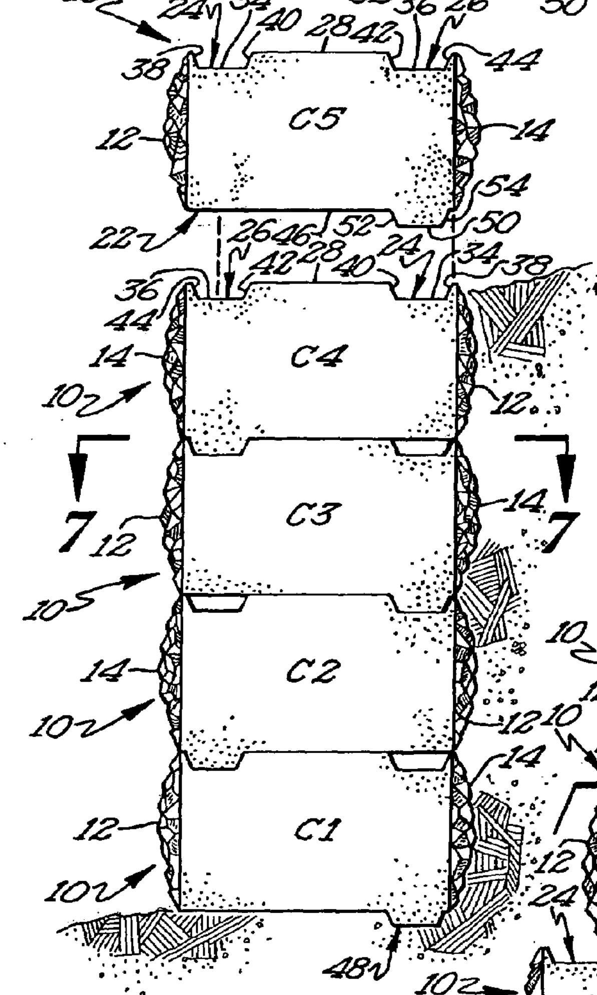
FIG. 5 is a cross-sectional view of a wall construction comprising a plurality of blocks arranged in substantially vertical courses.
Figure 7:
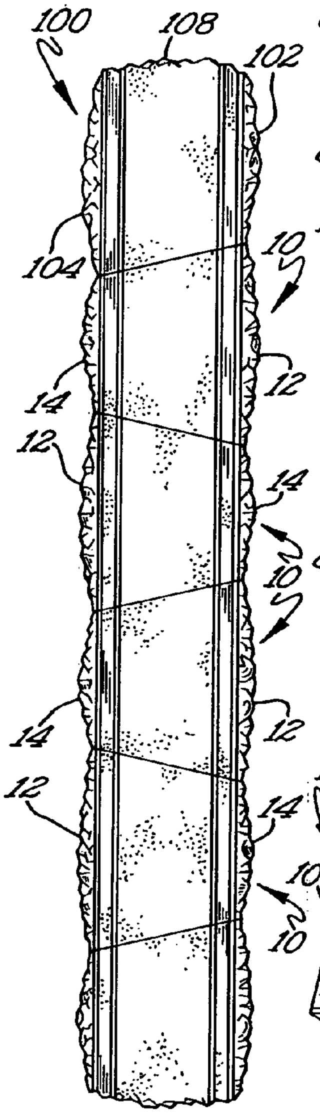
FIG. 7 is a top plan view of a course of blocks in the wall construction of FIG. 5.

It will be appreciated that the blocks of the present invention may be arranged in a variety of different manners. For example, the blocks could be arranged so that some of the front surfaces of the blocks and some of the rear surfaces of the blocks are on the same side of the wall. This arrangement would result in a substantially vertical wall, as depicted in FIG. 5. Note, in FIG. 5 that there are five courses of blocks, and that the courses are arranged in an alternating manner. More specifically, the blocks in the first C1, third C3, and fifth C5 courses have their front surfaces showing, while the blocks in the second C2 and fourth C4 courses have their rear surfaces showing. This alternating arrangement is best depicted in FIG. 7. Note that such an arrangement could be used to construct a wall structure that can approximate a unitary, poured wall having a minimum amount of voids. It will be appreciated that the blocks may be arranged differently, if desired. For example, the blocks could be arranged so that the front surfaces face in the same direction and the courses of blocks could be arranged in a running bond, with the projection of the upper course of blocks engaging the second, rearmost channel of the lower course of blocks. This arrangement could be used to construct a substantially vertical wall (see, for example, FIG. 14). Or, the blocks may be arranged in a more random manner, so that most of the blocks have their front surfaces on the same side. It will be understood that in all of the above described vertical wall constructions, the projections will engage the channels of vertically adjacent blocks.

Figure 6:
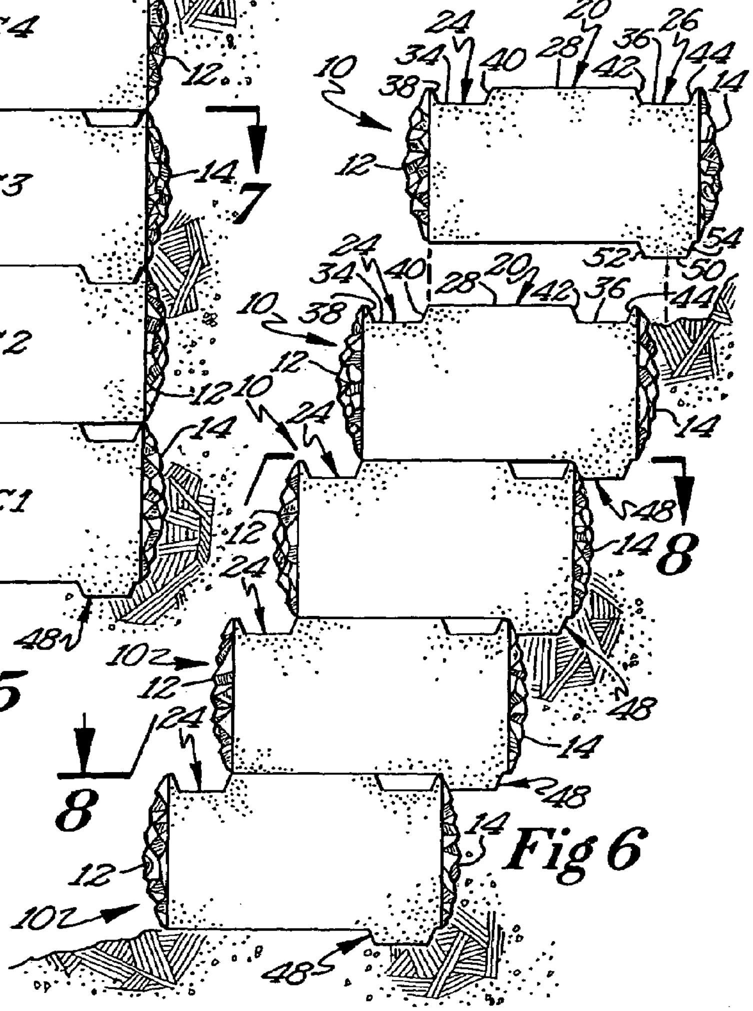
FIG. 6 is a cross-sectional view of a wall construction comprising a plurality of blocks arranged in a plurality of offset courses.

Alternatively, the front surfaces could face in the same direction, and the courses of blocks could be arranged in a running bond. However, instead of engaging the rearmost channel, with the projections of the upper course of blocks engage the upper edges of the rear surfaces of the lower course of blocks, as depicted in FIG. 6. This arrangement could be used to construct a wall in which courses are offset from each other, as is common in many retaining walls (see, FIG. 8).

Figure 9:
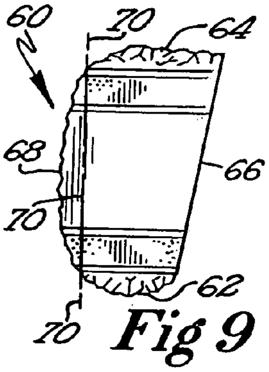
FIG. 9 is an alternative embodiment of FIG. 1 of the present invention.
Figure 10:
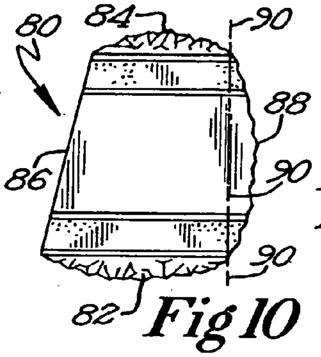
FIG. 10 is an alternative embodiment of FIG. 1 of the present invention.
Figure 11:
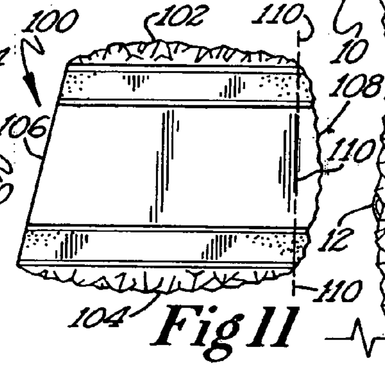
FIG. 11 is an alternative embodiment of FIG. 1 of the present invention.
Figure 8:
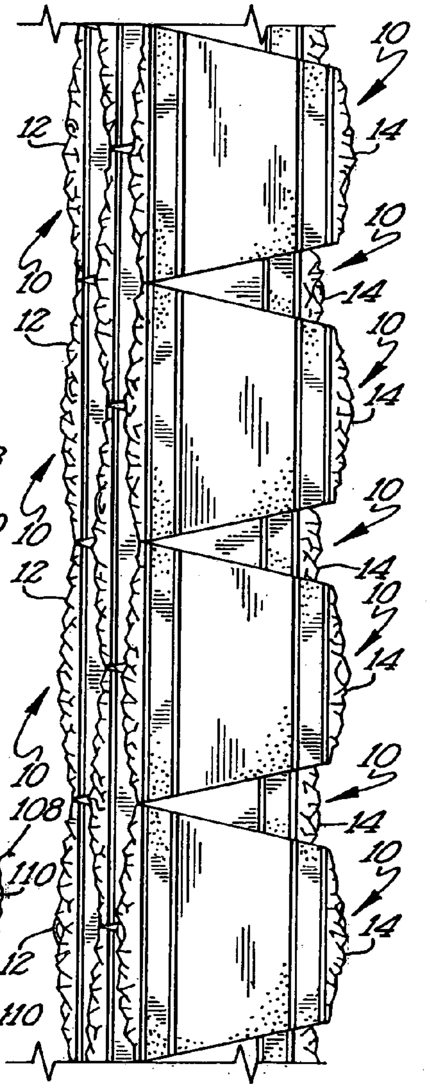
FIG. 8 is a top plan view of a plurality of courses of blocks in the wall construction of FIG. 6.
Figure 12:
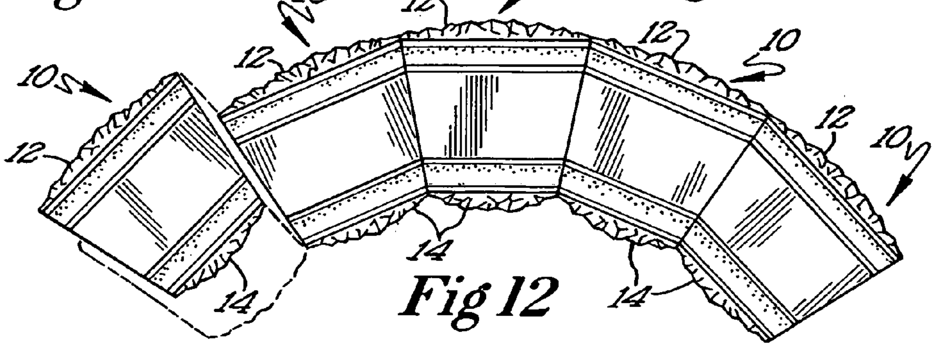
FIG. 12 is a top plan view of a course of a wall construction using the blocks of FIG. 1.

FIGS. 9, 10, and 11 depict preferred embodiments of masonry blocks that may be used at the ends of walls. These preferred embodiments are similar to the above-described blocks in that they have a front surface, a rear surface, opposing side surfaces, a top surface, and a bottom surface. The top surface also includes a pair of channels and a central section, with the channels being substantially linear and in alignment with each other between the side surfaces of the block. The bottom surface also includes a bottom section and a projection that is linearly shaped, which extends between the side surfaces, and which is in vertical alignment with the rearmost of the two channels as shown, for example, in FIGS. 2, 3, 19, 20, and 21.

More specifically, FIGS. 9, 10, and 11 represent three additional embodiments of different sizes of blocks that are based upon the trapezoidal block of the preferred embodiment of FIGS. 1, 4, 8, and 12. The block 60 of FIG. 9 shares some of the same dimensions as those of the trapezoidal block, namely depth and height (taken along the z and y directions in a three-dimensional coordinate system, see FIG. 1). However, the front, rear, and one of the opposing side surfaces are different than the corresponding surfaces of the trapezoidal block. As depicted, the front 62 and rear 64 surfaces are substantially smaller than the front and rear surfaces of the trapezoid of FIGS. 1, 4, 8, and 12. Preferably, the front surface 62 is in the range of about 20 to 50 percent of the width of the front surface 12 of a trapezoidal block, while the rear surface 64 is in the range of about 50 to 100 of the width of a rear surface 14 of a trapezoidal block. More preferably, the front surface is on the order of about 26 to 40 percent, while the rear surface is on the order of about 68 to 82 percent. As applied to a block 10 having a front 12 and rear 14 surfaces having widths in the range of around 48 and 32 inches, the widths of the front 62 and rear 64 surfaces of block 60 would be in the range of about 9.6-24.0, and 16.0-32.0 inches, for example.

As opposed to a generally trapezoid shape having two angled (opposing) side surfaces, block 60 has only one angled side surface 66 while the other, opposing side surface 68 is generally perpendicular to the front 62 and rear 64 surfaces. Preferably, the side surface 68, as shown, has a roughened texture similar to the front and rear surfaces of the previously described trapezoidally shaped block. The side surface 68 also extends outwardly with respect to an imaginary plane (depicted as dashed line 70) extending from the front to the rear surfaces in the z direction in a three dimensional coordinate system (see, FIG. 1). The maximum extent or relief of the outward extension is in the range of about 2.5 to 33.3 percent of the height of the block, taken in the x direction in a three-dimensional coordinate system (see, FIG. 1). As applied to a block having a height in the range of about 18 inches, the maximum outward extend of the front and rear surfaces would be on the order of 0.35 to 6.00 inches, for example.

The block 80 depicted in FIG. 10 is slightly larger than the block of FIG. 9, yet it is still smaller than the trapezoidal block as previously described. Preferably, the front surface 82 is in the range of about 50 to 100 percent of the width of the front surface 12 of a trapezoidal block 10, while the rear surface 84 is in the range of about 50 to 100 of the width of a rear surface 14 of a trapezoidal block 10. More preferably, the front surface is on the order of about 60 to 75 percent, while the rear surface is on the order of about 68 to 82 percent. As applied to a block having a front and rear surfaces having widths in the range of around 48 and 32 inches, respectively, the widths of the front 82 and rear 84 surfaces of block 80 would be in the range of about 24-48, and 16-32 inches, for example. Block 80 has only one angled side surface 86 while the other, opposing side surface 88 is generally perpendicular to the front 82 and rear 84 surfaces. Preferably, the side surface 88, as shown, has a roughened texture similar to the front and rear surfaces of the previously described trapezoidally shaped block. The side surface 88 also extends outwardly with respect to an imaginary plane (depicted as dashed line 90) extending from the front to the rear surfaces in the z direction in a three dimensional coordinate system (see, FIG. 1). The maximum extent or relief of the outward extension is in the range of about 2.5 to 33.3 percent of the height of the block, taken in the x direction in a three-dimensional coordinate system (see, FIG. 1). As applied to a block having a height in the range of about 18 inches, the maximum outward extend of the front and rear surfaces would be on the order of 0.35 to 6.00 inches, for example.

The block depicted in FIG. 11 is slightly larger than the trapezoidal block previously described. Preferably, the front surface 102 is in the range of about 70 to 100 percent of the width of the front surface 12 of a trapezoidal block 10, while the rear surface 104 is in the range of about 125 to 175 percent of the width of a rear surface 14 of a trapezoidal block 10. More preferably, the front surface is on the order of about 75 to 90 percent, while the rear surface is on the order of about 140 to 160 percent. As applied to a block having a front and rear surfaces having widths in the range of around 48 and 32 inches, respectively, the widths of the front 102 and rear 104 surfaces of block 100 would be in the range of about 33-48, and 40-56 inches, for example. Block 100 has only one angled side surface 106 while the other, opposing side surface 108 is generally perpendicular to the front 102 and rear 104 surfaces. Preferably, the side surface 108, as shown, has a roughened texture similar to the front and rear surfaces of the previously described trapezoidally shaped block. The side surface 108 also extends outwardly with respect to an imaginary plane (depicted as dashed line 110) extending from the front to the rear surfaces in the z direction in a three dimensional coordinate system (see, FIG. 1). The maximum extent or relief of the outward extension is in the range of about 2.5 to 33.3 percent of the height of the block, taken in the x direction in a three-dimensional coordinate system (see, FIG. 1). As applied to a block having a height in the range of about 18 inches, the maximum outward extend of the front and rear surfaces would be on the order of 0.35 to 6.00 inches, for example. As will be appreciated, the above-described blocks enable the ends of a wall to be finished in the same manner as with the front and rear surfaces of the blocks. Thus creating a finished appearance.

Figure 13:
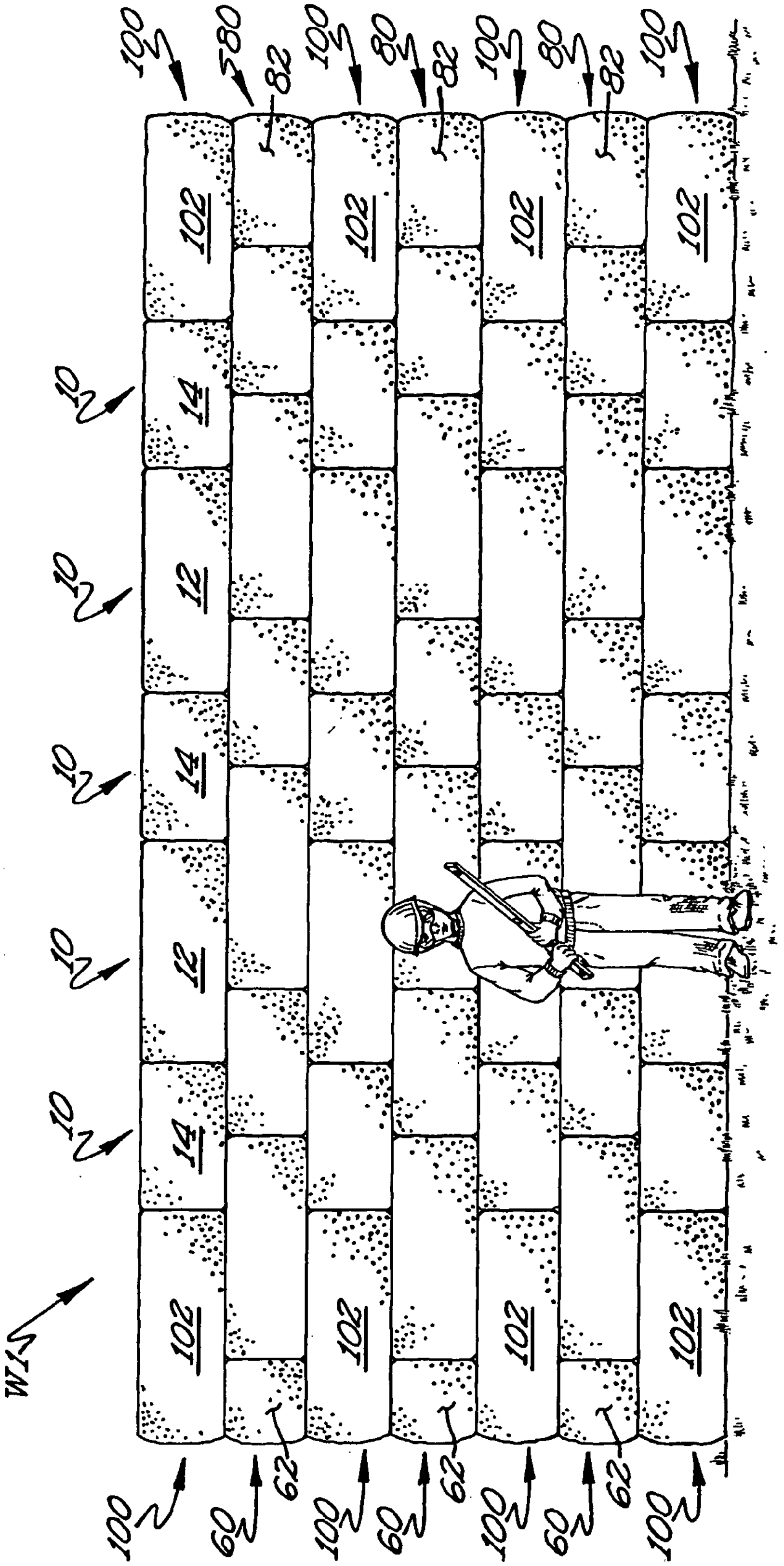
FIG. 13 is a front elevational view of a wall construction using the blocks of the present invention, in juxtaposition with a normally sized adult worker.
Figure 14:
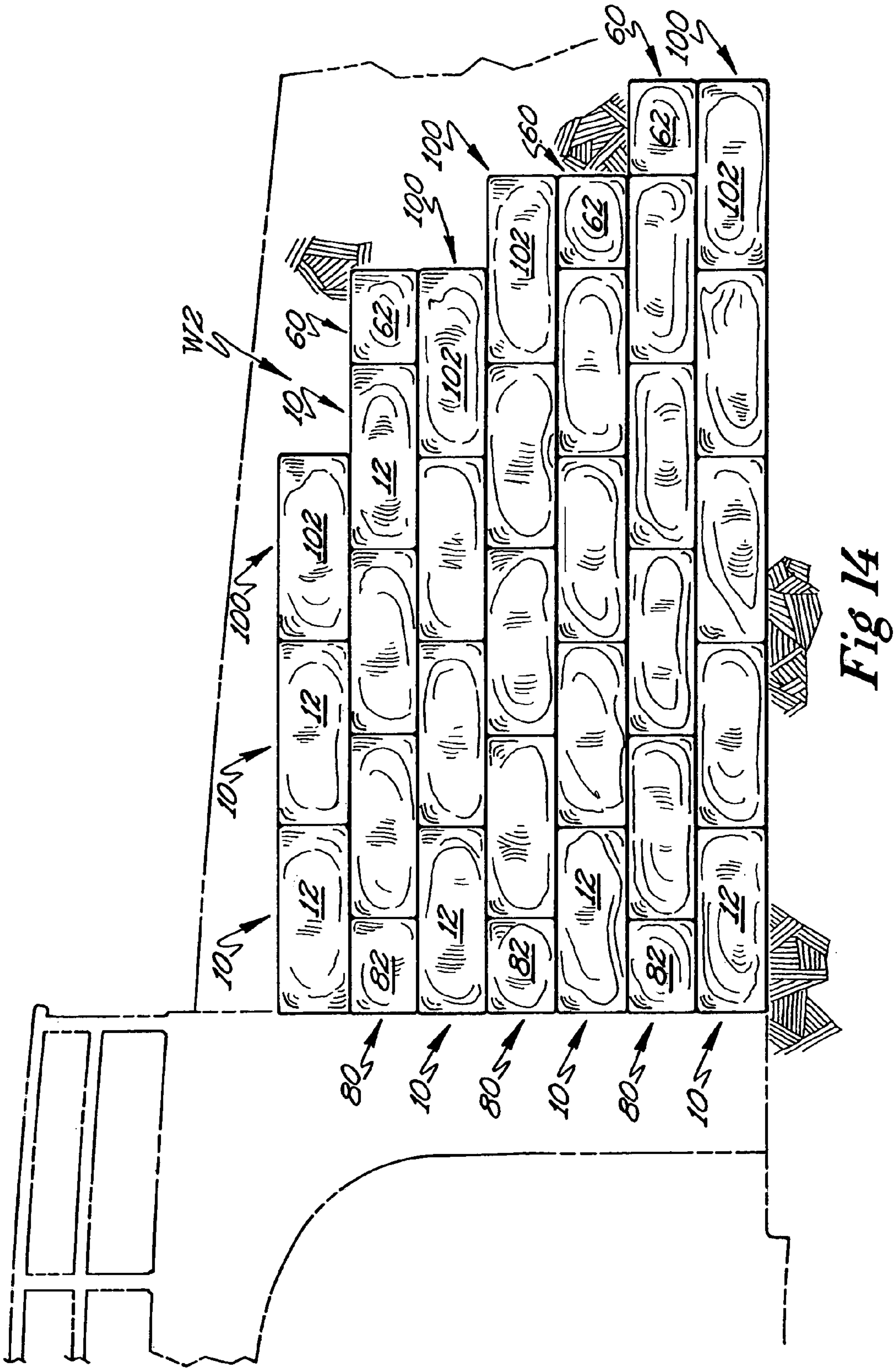
FIG. 14 is front elevational view of a wall construction used to retain backfill.

Examples of walls constructed with the above-described blocks are depicted in FIGS. 13 and 14. In FIG. 13, W1 is substantially vertical wall having two sides or faces and opposing ends, with the opposing ends generally parallel to each other and generally transverse to the faces of the wall W1. As will be noted, wall W1 is constructed so that the interior blocks 10 are positioned in an alternating manner, while the end blocks 60, 80, and 100, are selected based so that they form a common end surface. In FIG. 14, wall W2 is depicted as being used as a retaining wall. In this embodiment, most of the blocks 10 are trapezoidal and have their front surfaces facing the viewer. It will be understood that this type of wall may be either a substantially vertical wall or a sloping wall.

Figure 15:
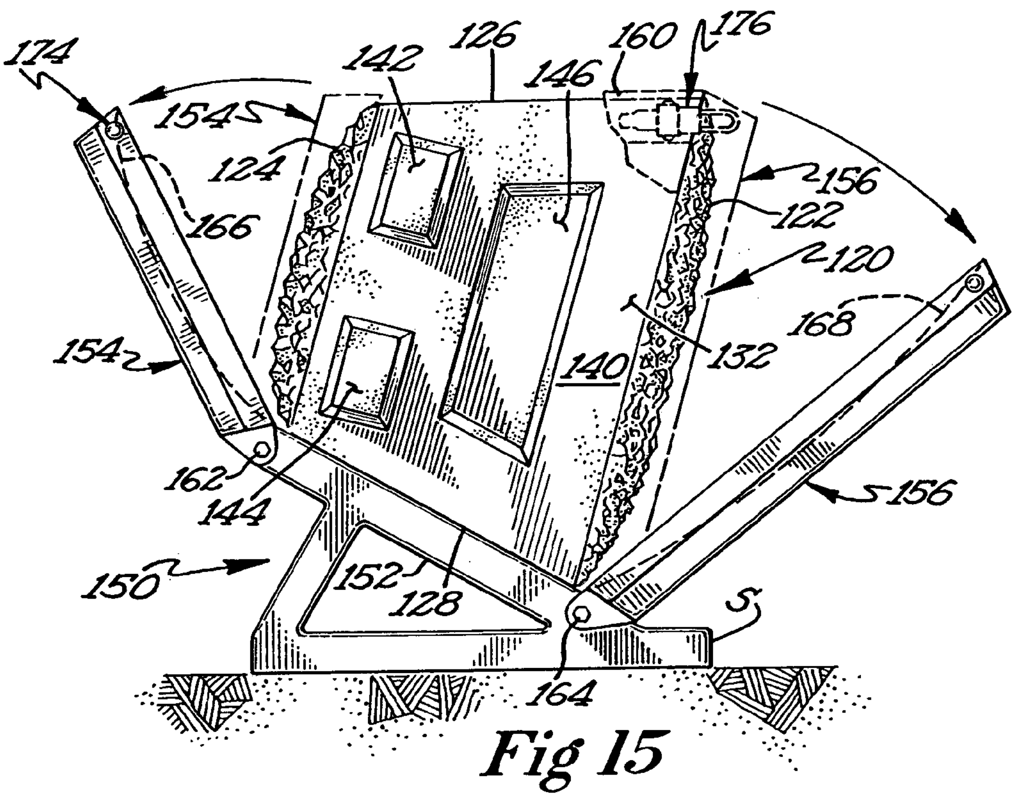
FIG. 15 is side elevational view of an alternative embodiment of the block of the present invention and an open mold in which the block was cast.
Figure 16:
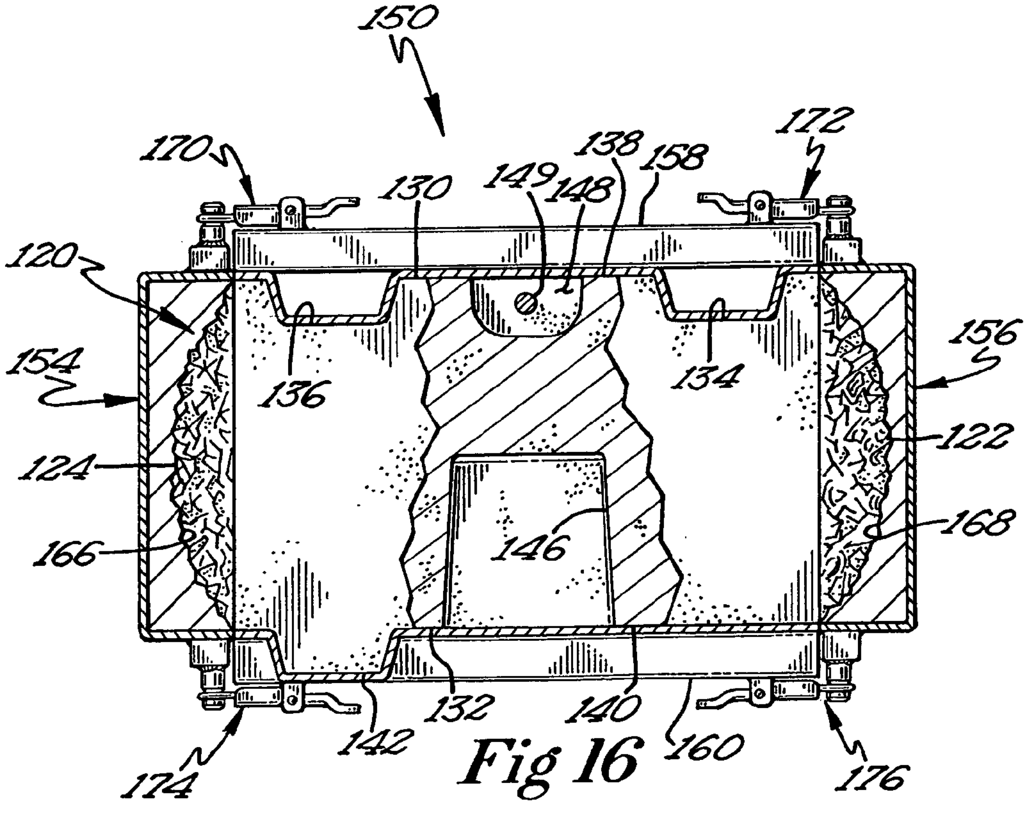
FIG. 16 is a top plan view of the block of FIG. 15 as it would be cast in a closed mold.
Figure 17:
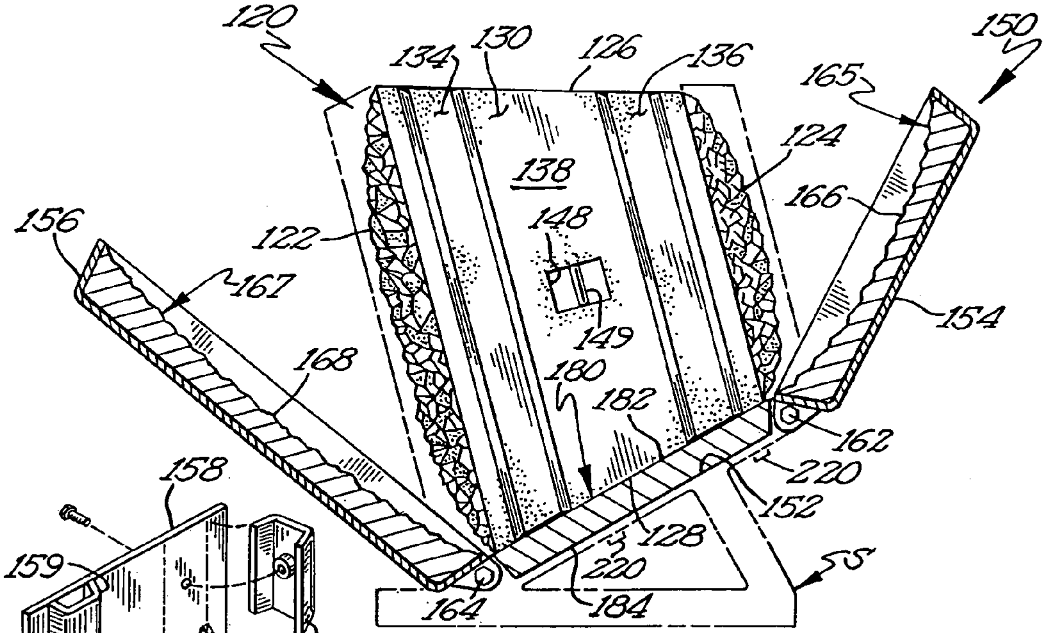
FIG. 17 is a partial, side elevational, obverse view of FIG. 15.

An alternative embodiment of the block of the present invention and a preferred mold are depicted in FIGS. 15, 16, and 17. Referring generally to FIG. 15, the block 120 of this embodiment is generally trapezoidally shaped and includes a front surface 122, a rear surface 124, a pair of opposed side surfaces 126 and 128 that extend between the front 122 and rear 124 surfaces, a top surface 130, and a bottom surface 132. The front and rear surfaces 122 and 124, as shown, are rough textured and extend outwardly with respect to the front edges of the top, bottom, and opposed side surfaces.

The bottom surface 132 comprises a bottom section 140 and a plurality of projections 142, 144, with each projection comprising a base and a pair of engagement surfaces. Preferably, the engagement surfaces of each projection are angled towards each other so that the projection tapers towards the base (see, FIG. 16). Preferably, the projections 142, 144 are located adjacent the rear surface 124 of the block 120 so that they are in vertical alignment with the rearmost channel 136 (see, FIG. 16). As can be seen, the projections 142, 144 are aligned in the x direction of a three-dimensional coordinate system across the width of the block 120 between the side surfaces 126 and 128 (compare with FIG. 1). Since the weight of the block 120 may become quite large and unmanageable even for a skid-steer loader, one or more cores can be used to reduce the weight without reducing the overall dimensions of the block. Such a core can be used advantageously at the bottom section 140 to produce a core hole 146, for example. This can allow more blocks to be loaded onto a transport, which saves time and money.

As depicted in FIGS. 16 and 17, the top surface of block 120 has two channels 134 and 136 that are spaced apart from each other by a center section 138. Preferably, both of the channels 134 and 136 are substantially linear and aligned so that they extend in the same direction, relative to the block 120. This is preferably in the x direction in a three-dimensional coordinate system, across the width of the block and between the opposing side surfaces 126 and 128 (compare with FIG. 1). The center section 138 is substantially planar and also preferably extends across the width of the block 120, between the opposing side surfaces 126 and 128. Optionally, the center section may be provided with an indentation 148 and a transverse rod or wire 149, which forms a lifting point for the block 120.

Figure 18A:
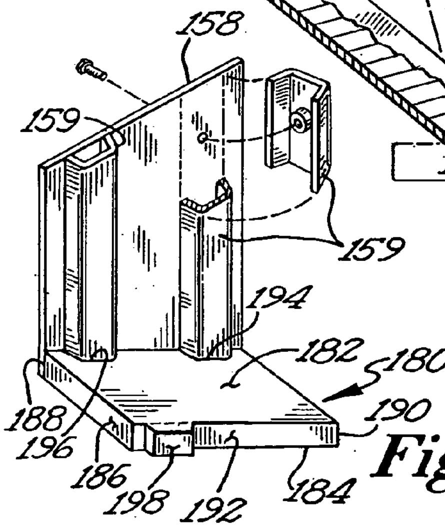
FIG. 18*a* is a partial perspective view of the insert of FIG. 17 and a mold wall used to form a side and top surface, respectively, of a block.

The side surface 128 of block 120 may be formed by an insert 180, which forms part of the mold conversion system, and which is depicted in FIGS. 17, and 18*a*. Generally, the insert 180 is configured to cooperate with the walls 154, 156, 158, and 160 of the mold 150 to form a mold cavity capable of retaining mold material. More specifically, the insert has an inner or first surface 182, an outer or second surface 184, and sides 186, 188, 190, 192. As will be understood, insert 180 may be provided with cutouts or relief areas 194, 196, which correspond to cores 159, which may be removably attached to side wall 158 by fastening elements, and which form the channels 134 and 136 of the block. In addition, the insert 180 may be provided with a tab or extension 198 (shown in dashed lines) that corresponds to a projection forming void (or voids) 161 formed in side wall 160 (see, for example, FIG. 18*b*), and permits the insert to be selectively positioned relative to the base 152 (see, for example, FIGS. 19 and 20). Alternatively, it will be understood that void (or voids) 161 could be provided with a plug (see 219 of FIG. 18*b*), which would obviate the need for a tab or extension 198. In use, insert 180 will be situated above the base or bottom 152 of the mold 150 (see, for example, FIGS. 15, 19, and 20). When the insert 180 is used to form a standard sized block, it may be attached to the base or bottom 152 by fastening elements 220.

Figure 18B:
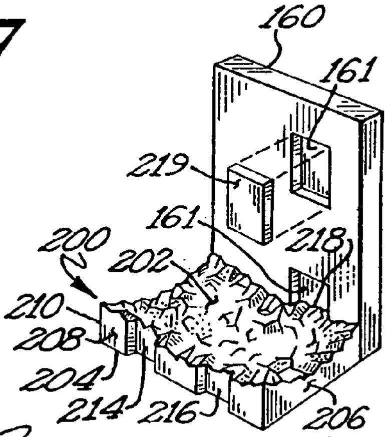
FIG. 18*b* is a partial perspective view of an alternative embodiment of an insert and a mold wall used to form a side and bottom surface, respectively, of a block.

Another insert, which may form a part of the mold conversion system, is shown in FIG. 18*b*. As with the previously described insert 180, insert 200 includes an inner or first surface 202, an outer or second surface 204, and sides 206, 208, 210, and 212 that cooperate with the sides 154, 156, 158, and 160 of the mold 150 to form a mold cavity capable of retaining mold material. In addition, the insert 200 may include cutouts or relief areas 214, 216, which correspond to the aforementioned cores 159, which may be removably attached to mold side wall 158 (see FIG. 18*a*). As with the previously described insert 180, insert 200 may also include a tab or extension 218 that corresponds to a void (or voids) 161 of side wall 160 that is used to form a projection in the bottom surface of a block. Preferably, though, void (or voids) 161 is provided with a plug (or plugs) 219, which is removably attached to the side wall 160 by fastening elements (not shown), and which obviates the need for a tab or extension 218.

As will be noted, the outer surface 204 of the insert 200 is similar to the outer surface 184 of insert 180 in that both surfaces are generally planar. However, the inner surface 202 of insert 200 differs from the inner surface 182 of insert 180. Instead of being generally planar, the inner surface 202 of insert 200 has a roughened or irregular texture to enable the mold to form blocks having a roughened or irregularly textured side surface, as depicted in FIGS. 9, 10, and 11, for example. While the insert 200 may be used in the manufacture of various sized blocks having a textured side, it will be appreciated that each bottom insert may be uniquely designed or tailored to each size block being formed, if desired. With regard to the use of inserts 200 and 180, it will be understood that insert 200 may be omitted from FIGS. 19 and 20 to enable different, straight-sided blocks to be formed.

The inserts 180 and 200 may be located and positioned above the base by one or more spacer elements that effectively support the weight of the mold material. Preferably, the spacer elements are in the form of posts as shown, for example, in FIG. 19 as 222 and 224, and in FIG. 20 as 223 and 225. The posts may be formed in predetermined sizes, or they may be adjustable (not shown) so that the width of the block may be customized. It will be appreciated that the spacer elements may take other forms without departing from the spirit and scope of the invention. As will be understood, the upper ends of posts 222, 224, 223, and 225 may be configured to be releasably connected to the bottom of any one of the inserts to form a free-standing structure that can be placed in the mold. In addition, the bottom ends of the posts may be releasably connected to a bracket 226, which is configured to reside at the bottom of the mold, and which prevents the post and insert structure from shifting when the side walls of the mold are unlatched and extended away from each other.

It will be appreciated that with the conversion system, different inserts may be used to fabricate different blocks.

Figure 19:
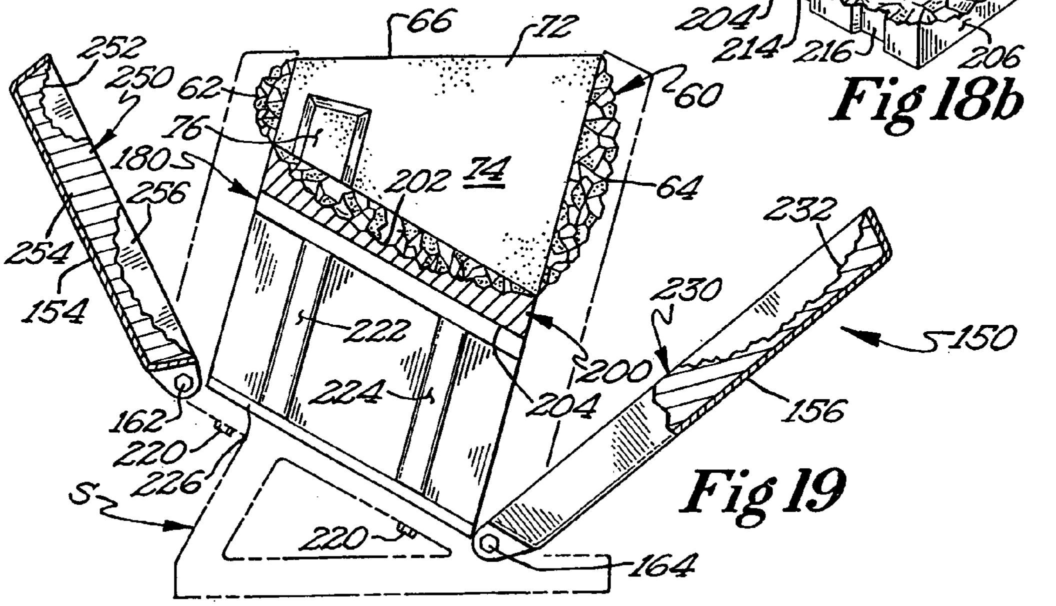
FIG. 19 is a partial, side elevational, obverse view of the block of FIG. 9 and an open mold in which the block was cast.
Figure 20:
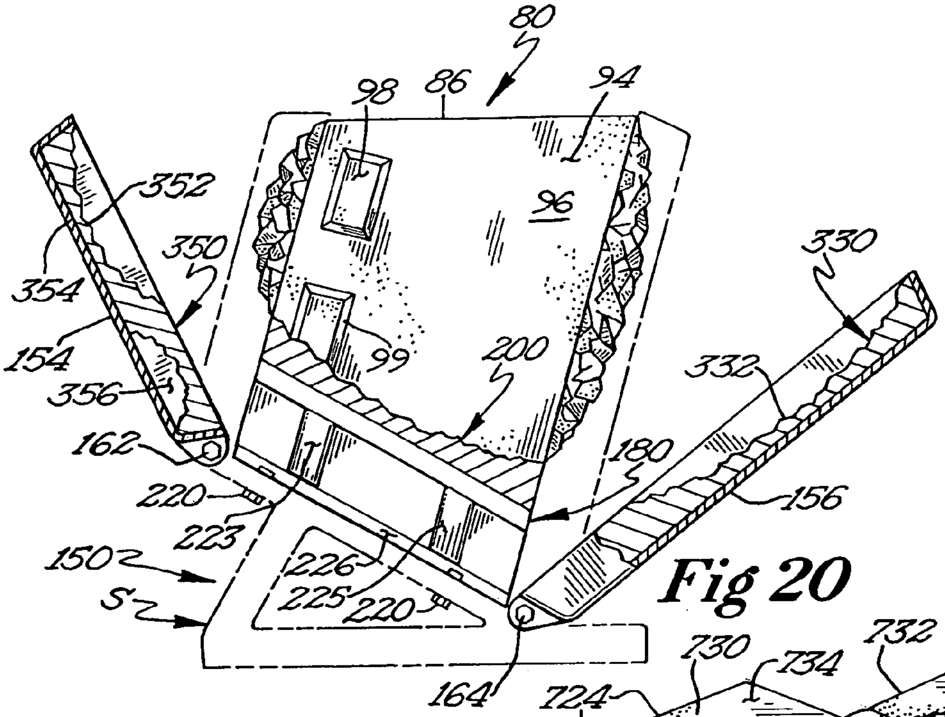
FIG. 20 is a partial, side elevational, obverse view of the block of FIG. 10 and an open mold in which the block was cast.
Figure 21:
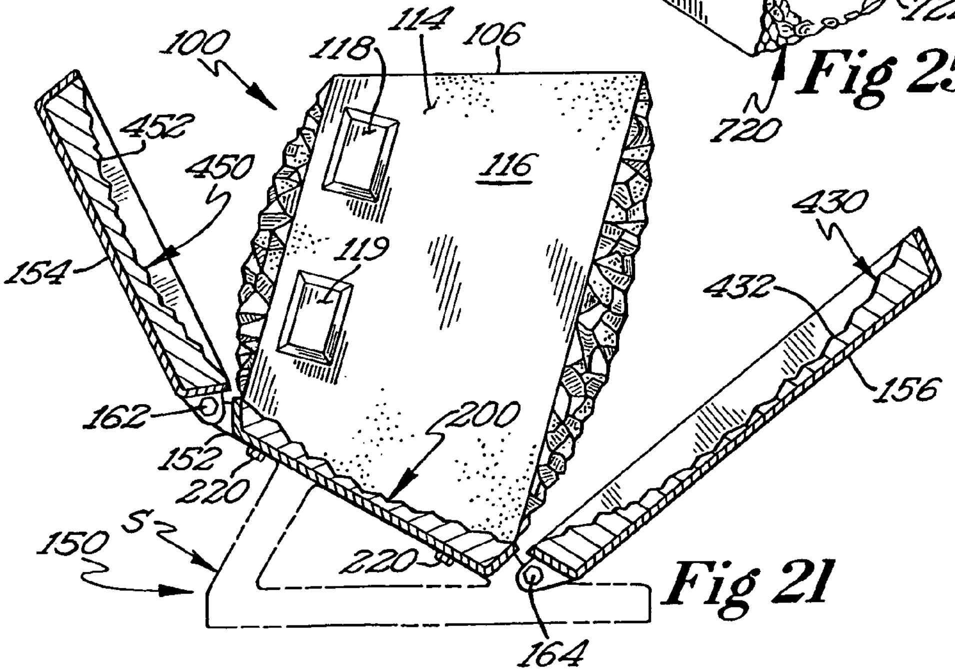
FIG. 21 is a partial, side elevational, obverse view of the block of FIG. 11 and an open mold in which the block was cast.

For example: inserts 180, 165, and 167, having inner surfaces 182, 166, and 168, may be used to form the block of FIGS. 1-8, 12, and 15-17: inserts 200, 230, and 250, having inner or first surfaces 202, 232, and 252, may be used to produce the block of FIGS. 9 and 19; inserts 200, 330, and 350, having inner or first surfaces 202, 332, and 352, may be used to produce the block of FIGS. 10 and 20; and inserts 200, 430, and 450, having inner surfaces or first 202, 432, and 452, may be used to produce the block of FIGS. 11 and 21.

It will also be appreciated that some inserts may be used to form more than one block; that is, they may be movably positionable in one of several orientations relative to the mold. For example, insert 250 may be provided with two areas with roughened textures 252 and 256, which correspond to the rear surfaces 64 and 84 of blocks 60 and 80 (see, FIGS. 19 and 20). Thus, to switch from forming a block as depicted in FIG. 19 to a block as depicted in FIG. 20, a user need only reposition the insert 250 so that the roughened texture 256 is higher than roughened texture 252 and the second surface 254 is adjacent side wall 154. Similarly, insert 350 may be provided with two areas with roughened textures 352 and 356, which correspond to the rear surfaces 84 and 64 of blocks 80 and 60. Thus, to switch from forming a block as depicted in FIG. 20 to a block as depicted in FIG. 19, a user need only reposition the insert 350 so that the roughened texture 356 is higher than roughened texture 352 and the second surface 354 faces away from side wall 154.

Figure 22:
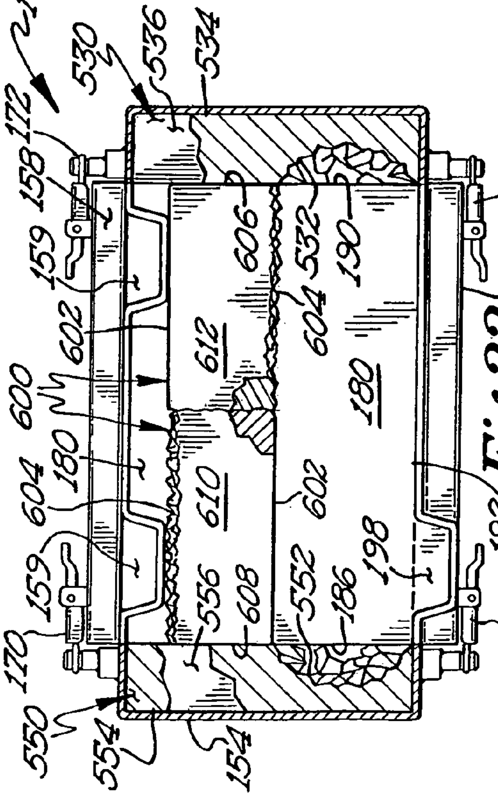
FIG. 22 is a top plan view of an alternative embodiment of the mold system in which the mold is configured to cast top course blocks.

It will also be appreciated that the conversion system permits the mold to form blocks having different thicknesses. For example, the mold 150 may be provided with inserts 530, 550, and 600, having inner or first surfaces 532, 552, and 602, and outer surfaces or second 534, 554, and 604, as depicted in FIG. 22. Note that the inner or first surfaces 532 and 552 of inserts 530 and 550 are only partially irregular or roughened along their respective widths, while the outer or second surfaces 534 and 554 are generally smooth and planar. The insert 600, which includes an inner or first surface 602, an outer or second surface 604, side surfaces 606 and 608, a top surface 610, and a bottom surface 612, is configured and arranged to be positioned in several orientations within the mold cavity. Note that the outer surface 604 has a roughened or irregular texture. A feature of inserts 530, 550, and 600 is that they may also be repositioned within the mold so that they can form blocks having generally smooth and planar surfaces. That is, inserts 530 and 550 may be turned around so that their outer surfaces 534 and 554 face towards the mold cavity, while insert 600 may be turned on end so that its bottom surface 612 faces up and the outer surface 604 faces towards the mold cavity. Note that insert 600 is depicted in two orientations, with the left portion arranged to form the tops of blocks 618 and 610 of FIG. 23, and the right portion arranged to form the top of block 640.

Figure 23:
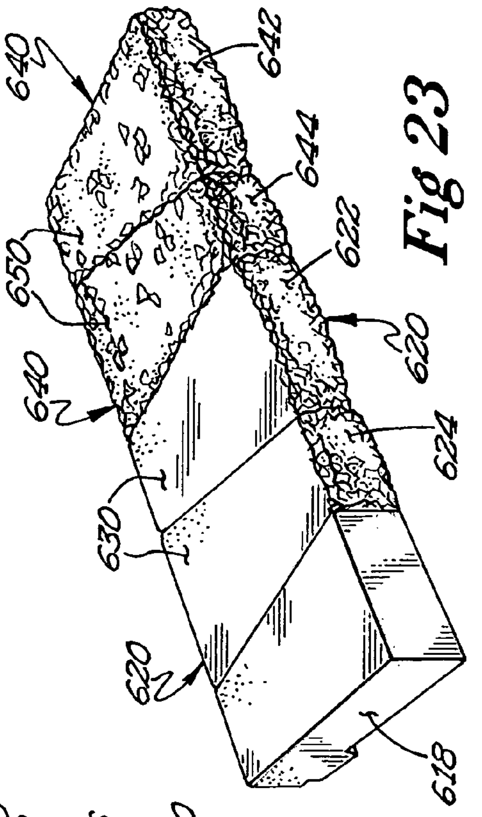
FIG. 23 is a perspective view of a plurality of blocks cast using the mold system of FIG. 22.

Some examples of blocks that may be formed using the mold and inserts of the conversion system depicted in FIG. 22 can be seen in FIG. 23. Starting with the left side is a block 618 that has smooth and generally planar front, rear, and top surfaces. Moving to the right, the next two blocks 620 have irregular or roughened front 622 and rear 624 surfaces, and a smooth and generally planar top surface 630. The remaining two blocks 640 have irregular or roughened front 642, rear 644, and top 650 surfaces. As one may well appreciate, other block configurations are possible.

Figure 25:
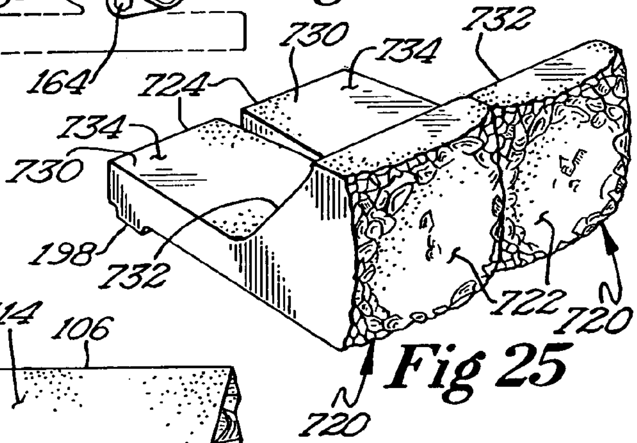
FIG. 25 is a perspective view of a plurality of blocks cast using the mold system of FIG. 24.
Figure 24:
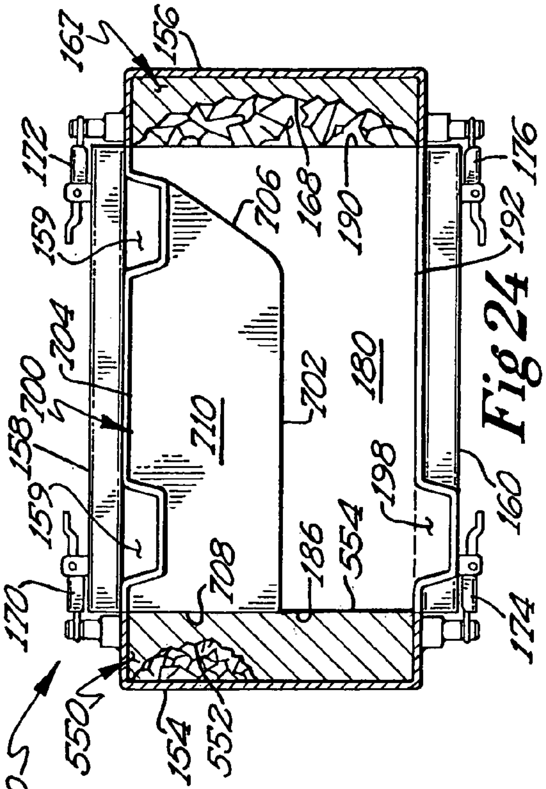
FIG. 24 is a top plan view of an alternative embodiment of the mold system in which the mold is configured to cast top course blocks.

It is also possible for the mold conversion system to form blocks having different irregular dimensions. For example, the mold 150 may be provided with inserts 167, 550 and 700, having inner surfaces 168, 552, 702 and 706, as depicted in FIG. 24. Note that the inner surface 552 of insert 550 is only partially irregular or roughened along its respective width. The block, 720 formed by the mold and the inserts of FIG. 24 is depicted in FIG. 25 and includes an irregular or roughened front surface 722, a generally smooth and planar rear surface 724, and a top surface 730. Note that the top surface 730 includes a transition 732 that extends from the front surface 722 towards the rear surface 724 and leads to a generally planar surface 734, which may be covered with material such as soil.

Figure 26:
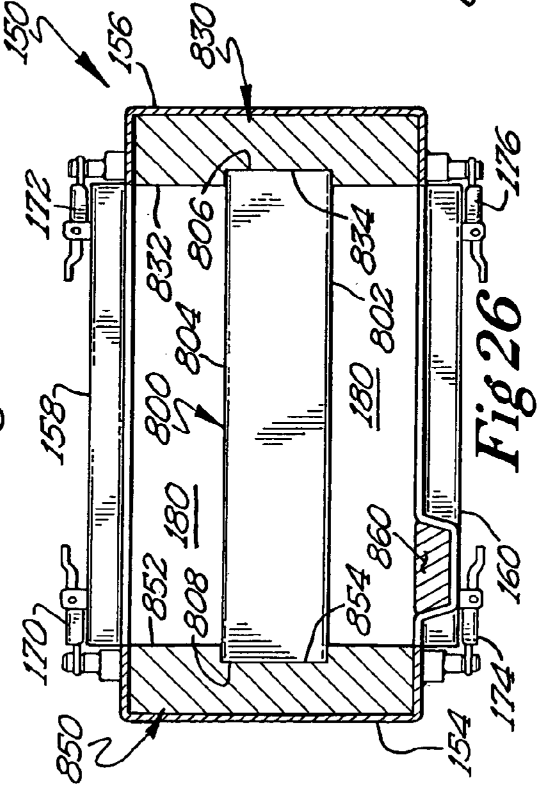
FIG. 26 is a top plan view of an alternative embodiment of the mold system in which the mold is configured to cast a plurality of top course blocks.

Another combination of inserts is depicted in FIG. 26. In this embodiment the mold 150 may be provided with inserts 830, 850 and 800, having substantially planar and smooth inner or first surfaces 832, 854, and surfaces 802 and 804, and which are able to form blocks that are generally trapezoidal when viewed from the top or bottom (see, for example, the blocks of FIG. 23). However, unlike the previously shown and described blocks, the blocks formed by the mold and inserts of FIG. 26 do not have channels or projections, as cores 159 have been removed from wall 158 and the void(s) 161 in wall 160 has/have been provided with the necessary number of plugs 860. As will be appreciated, securement of the insert 800 within the mold, though not necessary, is preferred. This can be achieved by providing the inserts 830 and 850 with slots 834 and 854, which are configured to receive the ends 806 and 808 of the insert. It will be understood, however, that insert 800 may be removably positioned within the mold by other known techniques and technologies.

While it will be appreciated that different methods and processes may be used to manufacture the aforementioned block embodiments, the inventor has discovered that the larger sized blocks are best suited for manufacture using the wet casting process. Moreover, it has been discovered that dimensional accuracy and consistency can be more easily achieved if the blocks are cast on their sides so that the front and rear surfaces are vertically oriented. FIG. 15 depicts a block 120 that is being removed from mold 150. As shown, the bottom or base 152 of the mold is positioned on a support "S" so that the side surface 126 of the block is more or less horizontal. Side walls 154 and 156, having textured surfaces 166, 168, and which are removably attached to the base 152 by pivot pins 162 and 164, have been unlatched from the other similarly attached side walls 158 and 160 (see, FIG. 16) of the mold 150 and swung away from contact with the block surfaces 124, 126. In this position, the block is now ready for removal from the mold. As will be understood, the side walls of the mold are attached to each other by latches 170, 172, 174, 176, in a conventional manner.

An advantage to forming the block on its side is that it ensures that the mold material is disbursed evenly along the channels and along the front and rear surfaces. In addition, it is easier to form the block such that the distance between the top and bottom surfaces is consistent and within manufacturing specifications. With the preferred method of casting, only one side of the block need be hand finished. And, as will be appreciated, this will not appreciably affect wall construction.

While preferred embodiments of the present invention have been shown and described, it should be understood that various changes, adaptations, and modifications may be made therein without departing from the spirit of the invention. Changes may be made in details, particularly in matters of shape, size, material, and arrangement of parts without exceeding the scope of the invention. Accordingly, the scope of the invention is as defined in the language of the appended claims.

What is claimed is:

1. A system for casting blocks, the system comprising:

a mold comprising;

a base having a plurality of edges; and, a plurality of side walls that correspond to the number of edges of the base and which intersect therewith, the base and side walls cooperating to form a cavity having a plurality of interior surfaces and an opening for receiving mold material;

a first, movably positionable insert comprising a first surface, a second surface spaced from the first surface, and a plurality of side surfaces, the insert configured and arranged to be supported by the base, the insert selectively positionable in a generally vertical direction with respect to the base of the mold, with the insert configured to form one side surface of a block having a top surface, a bottom surface, a front surface, a rear surface, and two side surfaces;

a second, reversibly positionable insert, with the second insert comprising a first surface, a second surface spaced from the first surface, and a plurality of side surfaces, with the first surface of the second insert having a first portion with a roughened, non-faceted cavity and a second portion that is generally smooth and planar, with the second insert configured to impart a roughened texture to a block when the second insert is in a first position, and with the second insert configured to impart a generally smooth and planar texture to a surface of a block when the second insert is in a second position; and a third, reversibly positionable insert, with the third insert comprising a first surface, a second surface spaced from the first surface, and a plurality of side surfaces, with the first surface of the third insert having a first portion with a roughened, non-faceted cavity and a second portion that is generally smooth and planar, with the third insert configured to impart a roughened texture to a block when the third insert is in a first position, and with the third insert configured to impart a generally smooth and planar texture to a surface of a block when the third insert is in a second position.

2. The system of claim 1, further comprising a fourth insert.

3. The system of claim 2, wherein the fourth insert comprises a first surface, a second surface spaced from the first surface, and a plurality of side walls, wherein the fourth insert configured to form a top surface of a block formed by the system.

4. The system of claim 2, wherein the fourth insert is configured and arranged to form two top surfaces of two blocks contemporaneously formed by the system.

5. A block formed by the system of claim 1.

6. A mold used to manufacture a block having a front surface, a rear surface spaced from the front surface, a pair of opposed side surfaces extending between the front and rear surfaces, a top surface, and a bottom surface spaced from the top surface, the mold comprising:

a base having a plurality of edges;

a first side wall having an inwardly facing, longitudinal mold surface with a substantially planar central section that extends the length thereof, and with a first, inwardly facing longitudinal projection that extends the length thereof;

a second side wall;

a third side wall having an inwardly facing, longitudinal mold surface with a substantially planar central section that extends the length thereof, and with an outwardly facing longitudinal recess;

a fourth side wall; and a first, reversibly positionable insert configured to be positioned against the second side wall, with the first insert having an inwardly facing first surface, an outwardly facing second surface, longitudinal side surfaces, and end surfaces, with the first surface of the first insert having a concavity that is configured to form a substantially convex front surface on a block formed by the mold, and with the second surface of the first insert configured to form a generally planar front surface on a block formed by the mold;

with the first, second, third and fourth side walls intersecting the edges of the base and movable towards each other so that the base and the side walls form a mold cavity having an open top for receiving mold material;

wherein the base forms one of the opposed side surfaces of a block, and wherein the first side wall, the first insert, the third side wall, and the fourth side wall form top, front, bottom and rear surfaces of the block.

7. A block formed by the mold of claim 6.

8. The mold of claim 6, wherein the inwardly facing longitudinal mold surface of the first side wall further comprises a second inwardly facing longitudinal projection that extends the length thereof.

9. The mold of claim 8, wherein the first and second inwardly facing longitudinal projections of the first side wall are substantially parallel to each other.

10. The mold of claim 6, further comprising a second insert configured to be positioned against the fourth side wall, with the second insert having an inwardly facing first surface, an outward facing second surface, longitudinal side surfaces, and end surfaces, and with the first surface of the second insert having an outwardly extending concavity that is configured to form a substantially convex rear surface on a block formed by the mold.

11. The mold of claim 10, further comprising a third insert configured to be positioned against the base of the mold, with the third insert having an inwardly facing first surface, an outwardly facing second surface, longitudinal side surfaces, and end surfaces, and with the first surface of the third insert having an outwardly extending concavity that is configured to form a substantially convex side surface on a block formed by the mold.

12. The mold of claim 11, further comprising a spacer element, with the spacer element positionable between the third insert and the base of the mold such that the first surface of the third inset may be positioned in one of several predetermined distances above the base of the mold, whereby the mold may be used to cast blocks having different predetermined widths.

13. The mold of claim 6, wherein the concavity of the first surface of the first insert has an outward extent in the range of about 2.5 to 33.3 percent of the distance between the longitudinal side surfaces of the first insert, with the outward extent measured relative to a plane defined by the front edges formed by the first surface, the longitudinal surfaces, and the end surfaces of the first insert.

14. The mold of claim 13, wherein the first insert may be reversibly positioned so that the second surface faces inwardly and the first surface faces outwardly.

15. The mold of claim 10, wherein the concavity of the first surface of the second insert has an outward extent in the range of about 2.5 to 33.3 percent of the distance between the longitudinal side surfaces of the second insert, with the outward extent measured relative to a plane defined by the front edges formed by the first surface, the longitudinal surfaces, and the end surfaces of the second insert.

16. The mold of claim 15, wherein the second insert may be reversibly positioned so that the second surface faces inwardly and the first surface faces outwardly.

17. The mold of claim 11, wherein the concavity of the first surface of the third insert has an outward extent in the range of about 2.5 to 33.3 percent of the distance between the longitudinal side surfaces of the third insert, with the outward extent measured relative to a plane defined by the front edges formed by the first surface, the longitudinal surfaces, and the end surfaces of the third insert.

18. The mold of claim 17, wherein the third insert may be reversibly positioned so that the second surface faces inwardly and the first surface faces outwardly.

19. The mold of claim 6, wherein the longitudinal recess of the third side wall of the mold has a substantially uniform cross-section along its length.

20. The mold of claim 10, wherein concavity of the first insert is larger than the concavity of the second insert.

21. A mold used to manufacture a block having a front surface, a rear surface spaced from the front surface, a pair of opposed side surfaces extending between the front and rear surfaces, a top surface, and a bottom surface spaced from the top surface, the mold comprising:

a base having a plurality of edges;

a first side wall having an inwardly facing mold surface that includes substantially planar central section that extends the length thereof and a first inwardly facing longitudinal projection that extends the length thereof;

a second side wall;

a third side wall having an inwardly facing mold surface that includes a substantially planar central section that extends the length thereof and an outwardly facing longitudinal recess;

a fourth side wall;

a first insert configured to be positioned adjacent the second side wall, with the first insert having an inwardly facing first surface, a second surface, longitudinal side surfaces, and end surfaces, and with the first surface of the first insert having a outwardly extending concavity that is curved between the longitudinal side surfaces and curved between the end surfaces; and a second insert configured to be positioned adjacent the fourth side wall, with the second insert having an inwardly facing first surface, a second surface, longitudinal side surfaces, and end surfaces, and with the first surface of the second insert having a outwardly extending concavity that is curved between the longitudinal side surfaces and curved between the end surfaces;

with the outwardly extending cavity of the second insert being smaller than the outwardly extending cavity of the first insert;

with the first, second, third and fourth side walls intersecting the edges of the base and movable towards each other so that the base and the side walls form a mold cavity having an open top for receiving mold material;

wherein the base forms one of the opposed side surfaces of a block;

wherein the first, and third, side walls form the top and bottom surfaces of a block; and wherein the first and second inserts form the front and rear surfaces of a block.

22. A system for casting blocks, the system comprising:

a mold comprising:

a base having a plurality of edges;

a first elongated side wall;

a second elongated side wall;

a third elongated side wall; and a fourth elongated side wall;

with the first, second, third and fourth elongated side walls intersecting the edges of the base and movable towards each other so that the base and the side walls form a mold cavity having an open top for receiving mold material;

a first, movably positionable insert comprising a first surface, a second surface spaced from the first surface, and a plurality of side surfaces, the first insert configured and arranged to be supported by the base, the insert selectively positionable in a generally vertical direction with respect to the base of the mold, with the first insert configured to form one side surface of a block having a top surface, a bottom surface, a front surface, a rear surface, and two side surfaces;

a second, reversibly positionable insert configured to be positioned adjacent the second elongated side wall with the second insert having an inwardly facing first surface, a second surface, longitudinal side surfaces, and end surfaces, and with the first surface of the second insert having a outwardly extending concavity that is curved between the longitudinal side surfaces and curved between the end surfaces, with the second insert configured to form the front surface of a block having a top surface, a bottom surface, a front surface, a rear surface, and two side surfaces; and a third, reversibly positionable insert configured to be positioned adjacent the fourth elongated side wall with the third insert having an inwardly facing first surface, a second surface, longitudinal side surfaces, and end surfaces, and with the first surface of the third insert having an outwardly extending concavity that is curved between the longitudinal side surfaces and curved between the end surfaces, with the concavity of the third insert being smaller than the concavity of the second insert, and with the third insert configured to form the rear surface of a block having a top surface, a bottom surface, a front surface, a rear surface, and two side surfaces;

wherein the first, second, and third inserts form the side, front and rear surfaces of a block and wherein the first and third elongated side walls form the top and bottom surfaces of the block.

23. The system of claim 1, further comprising a spacer element, with the spacer element positionable between the first inset and the base of the mold, whereby the mold may be used to cast blocks having different predetermined widths.

24. The mold of claim 21, wherein the surface of the mold used to form the side wall of a block is vertically adjustable, whereby the mold may be used to cast blocks having different predetermined widths.

25. The system of claim 22 wherein first surface of the first insert is substantially parallel to the base of the mold.

26. The system of claim 22, wherein the first surface of the first insert includes a rough textured, non-faceted, concavity that extends substantially to all of the side surfaces thereof.

* * * * *